United States Patent
Fujita et al.

(10) Patent No.: US 11,493,021 B2
(45) Date of Patent: Nov. 8, 2022

(54) WINDMILL BLADE, WINDMILL, AND METHOD OF MANUFACTURING WINDMILL BLADE

(71) Applicant: MITSUBISHI HEAVY INDUSTRIES, LTD., Tokyo (JP)

(72) Inventors: Takeshi Fujita, Tokyo (JP); Kentaro Shindo, Tokyo (JP); Hiroaki Takeuchi, Tokyo (JP); Toshiyuki Hirano, Tokyo (JP); Atsushi Yuge, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/245,305

(22) Filed: Apr. 30, 2021

(65) Prior Publication Data
US 2021/0363962 A1 Nov. 25, 2021

(30) Foreign Application Priority Data
May 22, 2020 (JP) .............................. JP2020-089416

(51) Int. Cl.
*F03D 1/06* (2006.01)
*F03D 80/30* (2016.01)
(52) U.S. Cl.
CPC ........... *F03D 1/0675* (2013.01); *F03D 80/30* (2016.05); *F05B 2230/21* (2013.01); *F05B 2240/301* (2013.01); *F05B 2240/303* (2020.08); *F05B 2280/2004* (2013.01)
(58) Field of Classification Search
CPC ....... F03D 1/0675; F03D 1/0683; F03D 80/30
See application file for complete search history.

(56) References Cited

U.S. PATENT DOCUMENTS

| 2,884,078 | A | * | 4/1959 | Stamm | ................. | B64C 27/473 |
| | | | | | | 29/889.72 |
| 5,499,782 | A | * | 3/1996 | Domine | ................ | B64D 45/02 |
| | | | | | | 244/1 A |
| 8,043,065 | B2 | * | 10/2011 | Kyriakides | ............ | F03D 80/30 |
| | | | | | | 416/223 R |
| 8,057,189 | B2 | * | 11/2011 | Riahi | .................... | F03D 1/0675 |
| | | | | | | 416/235 |
| 8,142,157 | B2 | * | 3/2012 | Kita | ........................ | F03D 80/00 |
| | | | | | | 416/224 |

(Continued)

FOREIGN PATENT DOCUMENTS

| CN | 105673361 | 6/2016 |
| EP | 2 363 602 | 9/2011 |

(Continued)

OTHER PUBLICATIONS

English translation of WO 2018157929A1 (Year: 2018).*

(Continued)

*Primary Examiner* — Woody A Lee, Jr.
*Assistant Examiner* — Wesley Le Fisher
(74) *Attorney, Agent, or Firm* — Wenderoth, Lind & Ponack, L.L.P.

(57) ABSTRACT

A windmill blade includes a leading edge protector at a leading edge portion of a blade main body including a skin surrounding a hollow space. The leading edge protector is fixed to the skin from the hollow space.

13 Claims, 15 Drawing Sheets

(56) References Cited

U.S. PATENT DOCUMENTS

| | | | | |
|---|---|---|---|---|
| 8,327,710 | B2* | 12/2012 | Koste | F03D 80/30 |
| | | | | 416/61 |
| 8,961,142 | B2* | 2/2015 | Wansink | F03D 1/0675 |
| | | | | 416/241 A |
| 9,797,369 | B2* | 10/2017 | Kratmann | F03D 1/0633 |
| 10,473,086 | B2* | 11/2019 | Yarbrough | F03D 80/50 |
| 10,844,843 | B2* | 11/2020 | Fujioka | F03D 9/25 |
| 2009/0208284 | A1* | 8/2009 | Funnell | F16B 5/0642 |
| | | | | 403/374.3 |
| 2011/0059290 | A1 | 3/2011 | Gage et al. | |
| 2011/0206534 | A1 | 8/2011 | Riahi | |
| 2019/0162233 | A1* | 5/2019 | Lorenz | B64F 5/10 |
| 2021/0262350 | A1* | 8/2021 | Mathew | F03D 80/30 |

FOREIGN PATENT DOCUMENTS

| | | | |
|---|---|---|---|
| EP | 2 623 773 | 8/2013 | |
| EP | 2623773 A2 * | 8/2013 | F03D 1/0675 |
| JP | 2017-207001 | 11/2017 | |
| KR | 20150065230 A * | 6/2015 | |
| WO | WO-2018157929 A1 * | 9/2018 | |
| WO | 2018/219524 | 12/2018 | |

OTHER PUBLICATIONS

English translation of KR20150065230A (Year: 2015).*
Extended European Search Report dated Oct. 19, 2021 in corresponding European Patent Application No. 21172436.4.

* cited by examiner

WINDMILL BLADE, WINDMILL, AND METHOD OF MANUFACTURING WINDMILL BLADE

CROSS-REFERENCE TO RELATED APPLICATIONS

This application claims the benefit of priority to Japanese Patent Application Number 2020-089416 filed on May 22, 2020. The entire contents of the above-identified application are hereby incorporated by reference.

TECHNICAL FIELD

The present disclosure relates to a windmill blade, a windmill, and a method of manufacturing the windmill blade.

RELATED ART

For example, in a windmill used in a wind power generation device or the like, erosion damage occurs due to repeated collision of raindrops, dust, or the like with a leading edge portion of a rotating windmill blade. In recent years, the peripheral speed of a blade tip portion of a windmill blade has increased with an increase in the size of the windmill, and the influence of erosion damage on the service life of the windmill has increased.

In order to suppress such erosion damage, a leading edge protector (LEP) may be disposed at a leading edge portion of a windmill blade where erosion damage is likely to occur. For example, WO 2018/219524 discloses a technique of suppressing erosion damage by covering a leading edge portion of a windmill blade with a shield member on a blade tip side where a peripheral speed of the windmill blade increases.

SUMMARY

As the leading edge protector such as the shield member of WO 2018/219524 described above, a thin tape-like form has been conventionally used on the surface of the windmill blade. However, there is a demand for a windmill blade having more excellent erosion resistance performance. Even when the leading edge protector provided on the windmill blade has such a thin form, there are not a few recesses and projections between the leading edge protector and the blade surface. Such recesses and projections may be starting points from which erosion damage develops, and may reduce the aerodynamic performance of the windmill blade.

At least one aspect of the present disclosure has been made in view of the above circumstances, and an object of the present disclosure is to provide a windmill blade, a windmill, and a method of manufacturing the windmill blade, which are capable of obtaining satisfactory erosion resistance performance while maintaining aerodynamic performance.

In order to solve the above-described problems, a windmill blade according to at least one aspect of the present disclosure includes: a blade main body including a skin surrounding a hollow space; and a leading edge protector provided at a leading edge portion of the blade main body, the leading edge protector being fixed to the skin from an inner side of the hollow space.

In order to solve the above-described problems, a windmill according to at least one aspect of the present disclosure includes a windmill blade according to at least one aspect.

In order to solve the above-described problems, there is provided a method of manufacturing a windmill blade according to at least one aspect of the present disclosure, in which the windmill blade includes: a blade main body including a skin surrounding a hollow space; and a leading edge protector provided at a leading edge portion of the blade main body, the leading edge protector is fixed to the skin from an inner side of the hollow space, and the method includes: arranging, in a mold material for molding, the leading edge protector that has a trailing edge side surface to which one end of a bolt member is attached; laminating a constituent material of the skin on the leading edge protector such that the bolt member is exposed; and taking out a molded product from the mold material and engaging a nut with another end of the bolt member.

According to at least one aspect of the present disclosure, it is possible to provide a windmill blade, a windmill, and a method of manufacturing the windmill blade, which are capable of obtaining satisfactory erosion resistance performance while maintaining aerodynamic performance.

BRIEF DESCRIPTION OF DRAWINGS

The disclosure will be described with reference to the accompanying drawings, wherein like numbers reference like elements.

DESCRIPTION OF EMBODIMENTS

Figure 1:
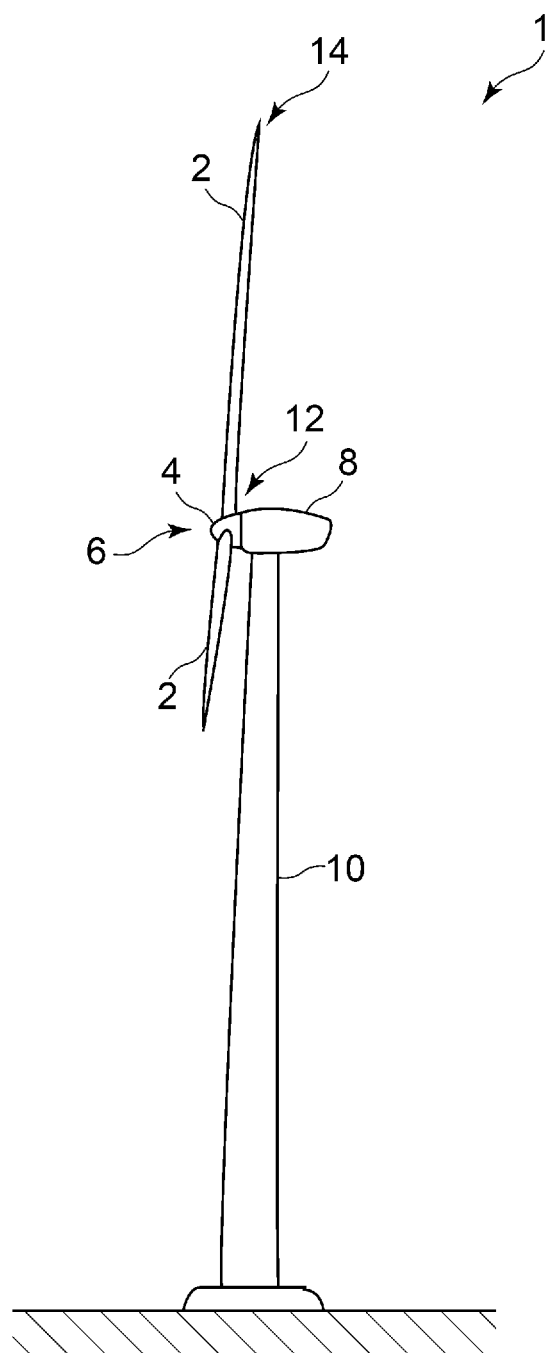
FIG. 1 is an overall configuration diagram schematically illustrating a windmill according to one embodiment.

Hereinafter, some embodiments of the present disclosure will be described with reference to the accompanying drawings. However, dimensions, materials, shapes, relative arrangements, or the like of components described in the embodiments or in the drawings are not intended to limit the scope of the present disclosure thereto, and are merely illustrative examples. For example, an expression of relative or absolute arrangement such as "in a direction", "along a direction", "parallel", "orthogonal", "centered", "concentric" or "coaxial" shall not be construed as indicating only the arrangement in a strict literal sense, but also includes a state where the arrangement is relatively displaced by a tolerance, or by an angle or a distance within a range where the same function can be achieved.

For example, an expression of an equal state such as "same", "equal", "uniform" or the like shall not be construed as indicating only the state in which the feature is strictly equal, but also includes a state in which there is a tolerance or a difference within a range where the same function can be achieved.

Further, for example, an expression of a shape such as a rectangular shape, a cylindrical shape or the like shall not be construed as only the geometrically strict shape, but also includes a shape with unevenness, chamfered corners or the like within a range where the same effect can be achieved.

On the other hand, an expression such as "provide", "comprise", "contain", "include", or "have" are not intended to be exclusive of other components.

First, a configuration of a windmill 1 according to at least one embodiment of the present disclosure will be described. FIG. 1 is an overall configuration diagram schematically illustrating the windmill 1 according to one embodiment.

The windmill 1 includes at least one windmill blade 2. The windmill blade 2 is attached to a hub 4, so that the windmill blade 2 and the hub 4 constitute a windmill rotor 6 that is rotatable about a rotor shaft. In the windmill rotor 6 of the windmill 1 illustrated in FIG. 1, three windmill blades 2 are attached to the hub 4 at equal intervals around the rotor shaft. Each windmill blade 2 includes a blade root portion 12 connected to the hub 4 and a blade tip portion 14 located opposite to the blade root portion 12 in the blade longitudinal direction. The windmill rotor 6 is rotatably attached to a nacelle 8 that is pivotably provided on a tower 10. In the windmill 1 having such a configuration, when wind hits the windmill blade 2, the windmill rotor 6 including the windmill blades 2 and the hub 4 rotates around the rotor shaft.

The windmill 1 may be configured as a wind power generation device, for example. In this case, the nacelle 8 houses a power generator and a power transmission mechanism for transmitting rotation of the windmill rotor 6 to the power generator. In the windmill 1, rotational energy transmitted from the windmill rotor 6 to the power generator by the power transmission mechanism is converted into electric energy by the power generator.

Figure 2:
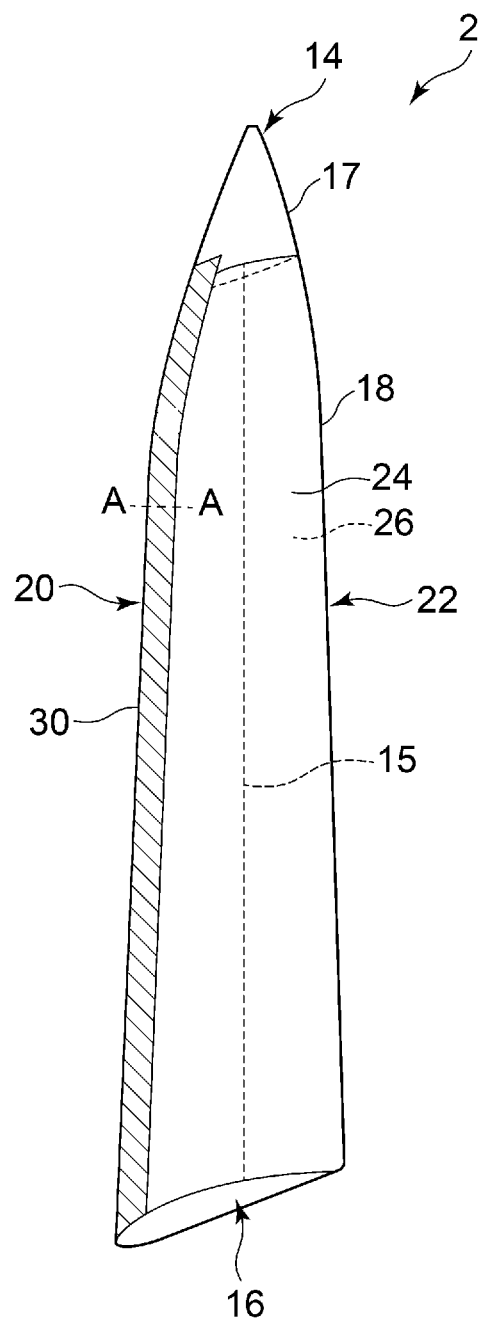
FIG. 2 is a schematic view illustrating a blade tip portion side of the windmill blade according to one embodiment.
Figure 3:
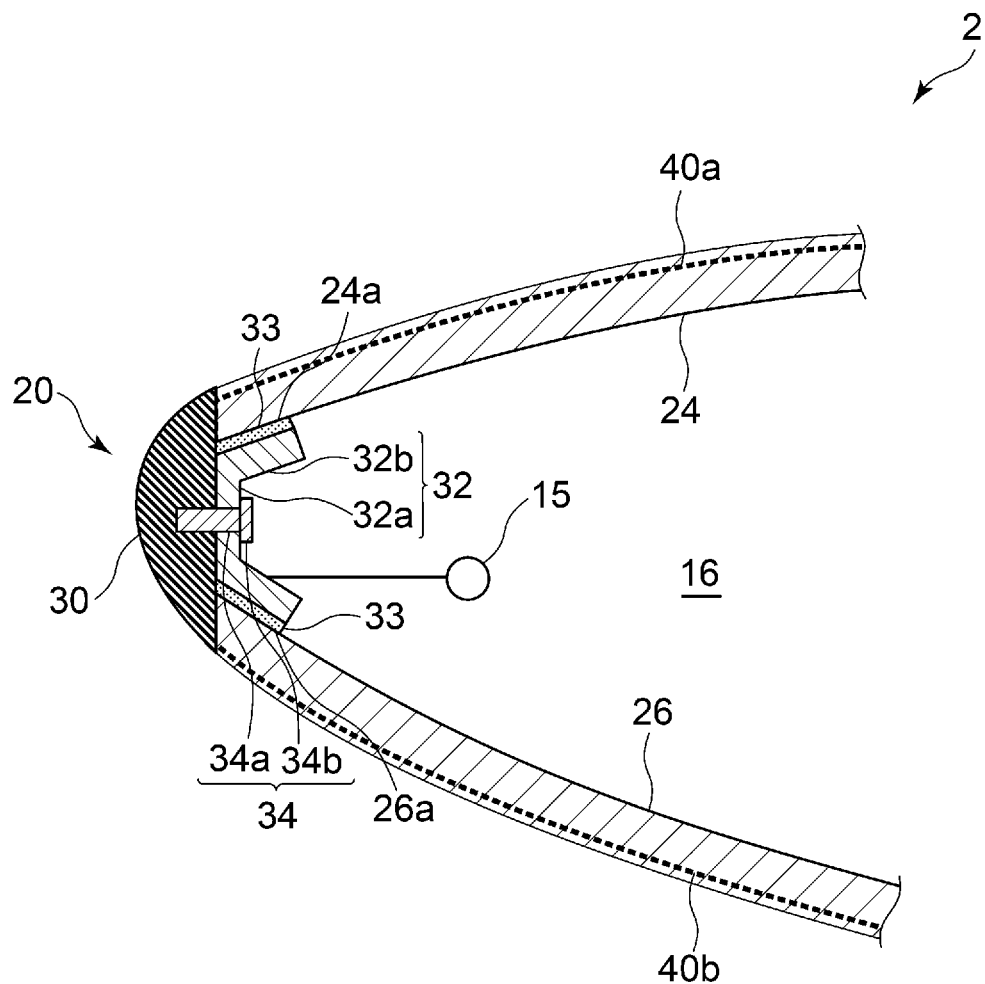
FIG. 3 is a cross-sectional view taken along line A-A in FIG. 2 according to one embodiment.

FIG. 2 is a schematic view illustrating the blade tip portion 14 side of the windmill blade 2 according to one embodiment, and FIG. 3 is a cross-sectional view taken along line A-A in FIG. 2 according to one embodiment.

The windmill blade 2 includes a blade main body 18. The blade main body 18 extends from the blade root portion 12 (see FIG. 1) toward the blade tip portion 14 along the blade longitudinal direction, and includes a leading edge portion 20 provided on a leading side in the blade chord direction and a trailing edge portion 22 provided on a trailing side in the blade chord direction.

The blade main body 18 includes a skin containing fiber-reinforced plastic. As the fiber-reinforced plastic constituting the skin, for example, glass fiber-reinforced plastic (GFRP) or carbon fiber-reinforced plastic (CFRP) can be used.

In the present embodiment, the blade main body 18 includes a suction-side skin 24 and a pressure-side skin 26 disposed so as to face each other. The suction-side skin 24 and the pressure-side skin 26 are connected to each other at the leading edge portion 20 and the trailing edge portion 22 of the blade main body 18, whereby a hollow space 16 surrounded by the skins is formed inside the blade main body 18.

Note that in the leading edge portion 20 and the trailing edge portion 22, the suction-side skin 24 and the pressure-side skin 26 are fixed to each other by being bonded, for example, by an adhesive or the like.

A down conductor 15 is arranged in the hollow space 16. The down conductor 15 is configured to include a conductive material, and constitutes at least a part of an electrical path through which a lightning current generated in the windmill blade 2 flows when the windmill 1 is struck by lightning. The down conductor 15 extends from a tip receptor 17 provided on the blade tip portion 14 along the blade longitudinal direction inside the hollow space 16, and is electrically connected to a ground wire (not illustrated) provided on the blade root portion 12 side.

The windmill blade 2 includes a leading edge protector 30. The leading edge protector 30 is provided so as to cover the leading edge portion 20, thereby protecting the leading edge portion 20 from raindrops, dust, or the like during operation of the windmill 1, and protecting the blade main body 18 from erosion damage.

As illustrated in FIG. 3, the leading edge protector 30 is fixed to the suction-side skin 24 and the pressure-side skin 26 from the inner side of the hollow space 16. In the present embodiment, such fixing of the leading edge protector 30 to the skins is performed by a first fixing member 32 and a second fixing member 34.

The first fixing member 32 is fixed to the inner surfaces 24a and 26a of the suction-side skin 24 and the pressure-side skin 26, and is arranged so as to come into contact with the leading edge protector 30 from the hollow space 16 side. More specifically, the first fixing member 32 includes a main body portion 32a that comes into contact with the leading edge protector 30, and extending portions 32b that are connected to the main body portion 32a and extends along the inner surfaces 24a and 26a of the skins. Two extending portions 32b are provided on both sides of the main body portion 32a so as to correspond to the suction-side skin 24 and the pressure-side skin 26. These extending portions 32b are fixed to the inner surfaces 24a and 26a of the suction-side skin 24 and the pressure-side skin 26 via bonding layers 33 formed by solidifying adhesives, and have shapes along the inner surfaces 24a and 26a to increase contact areas with the skins. Accordingly, the first fixing member 32 is more firmly fixed to the suction-side skin 24 and the pressure-side skin 26.

The second fixing member 34 fixes the leading edge protector 30 together with the first fixing member 32 from the inner side of the hollow space 16. More specifically, the second fixing member 34 includes a bolt member 34a and a nut member 34b. The bolt member 34a penetrates the main body portion 32a of the first fixing member 32, and one end thereof is fixed to the leading edge protector 30. The nut member 34b is engaged with the other end of the bolt member 34a from the hollow space 16 side. The second fixing member 34 including the bolt member 34a and the nut member 34b can fix the leading edge protector 30 to the skins in an efficient layout together with the first fixing member 32 fixed to the inner surfaces of the skins.

Since the leading edge protector 30 is fixed to the skins constituting the blade main body 18 from the inner side of the hollow space 16 in this manner, various members for fixing the leading edge protector 30 to the skins are not exposed to the outside of the blade main body 18. Therefore, erosion damage of the windmill blade 2 can be effectively suppressed without reduction in the aerodynamic performance of the windmill blade 2.

The first fixing member 32 is fixed between a pair of the mutually facing inner surfaces 24a and 26a of the suction-side skin 24 and the pressure-side skin 26 constituting the blade main body 18. The distance between the pair of inner surfaces 24a and 26a is configured to decrease toward the leading edge portion 20, and the first fixing member 32 sandwiched therebetween is structurally prevented from coming out to the outside (leftward in FIG. 3). This further reduces the risk of the leading edge protector 30 falling off from the blade main body 18.

The leading edge protector 30 may be composed of a conductive material. In this case, a metal material, for example, such as stainless steel, aluminum, or copper can be used as the conductive material. Thus, when the windmill blade 2 is struck by lightning, the leading edge protector 30 composed of the conductive material forms at least a part of a transmission path of a lightning current, thereby obtaining satisfactory lightning protection performance.

In the present embodiment, in addition to the leading edge protector 30, the first fixing member 32 and the second fixing member 34 are also composed of a conductive material. The leading edge protector 30, the first fixing member 32, and the second fixing member 34 are electrically connected to the down conductor 15 in a state where the leading edge protector 30, the first fixing member 32, and the second fixing member 34 are assembled to be in contact with each other. As a result, a lightning current generated in the leading edge protector 30 is guided to the down conductor 15 via the first fixing member 32 and the second fixing member 34, so that the windmill blade 2 can obtain satisfactory lightning protection performance.

Conductive mesh members 40a and 40b are provided in the vicinity of the outer surfaces of the suction-side skin 24 and the pressure-side skin 26 along the blade chord direction. The conductive mesh members 40a and 40b are mesh-shaped conductive members in which a plurality of holes are formed along the thickness direction of the skins, and are configured to be embedded in the skin. The conductive mesh members 40a and 40b are electrically connected to the leading edge protector 30 on the leading edge side. As a result, a lightning current generated in the leading edge protector 30 is guided to the conductive mesh members 40a and 40b, so that the windmill blade 2 can obtain satisfactory lightning protection performance.

The conductive mesh members 40a and 40b may be electrically connected to the down conductor 15.

The leading edge protector 30 may be composed of a non-conductive material. In this case, by using, for example, hard ceramic as the non-conductive material, it is possible to reduce the weight of the windmill blade while achieving the erosion resistance performance.

As illustrated in FIG. 3, the outer surface of the leading edge protector 30 is configured to be connected consecutively (smoothly) to the leading edge sides of the adjacent suction-side skin 24 and pressure-side skin 26. As a result, since there are no recesses or projections at the boundary portions between the leading edge protector 30 and the suction-side skin 24 and between the leading edge protector 30 and the pressure-side skin 26 (or even when there are recesses and projections at the boundary portions, the size thereof can be suppressed to be small), it is possible to effectively prevent erosion damage from developing from the boundary portions as starting points. In addition, it is possible to suppress the influence of the installation of the leading edge protector 30 on the aerodynamic performance of the windmill blade 2.

Figure 4:
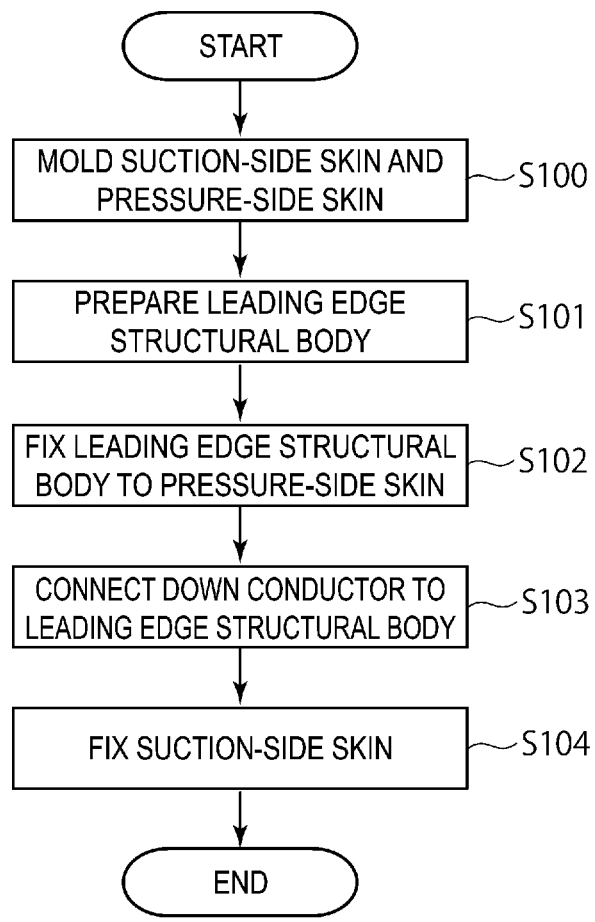
FIG. 4 is a flowchart illustrating a method of manufacturing the windmill blade in FIG. 3 for each step.
Figure 5A:
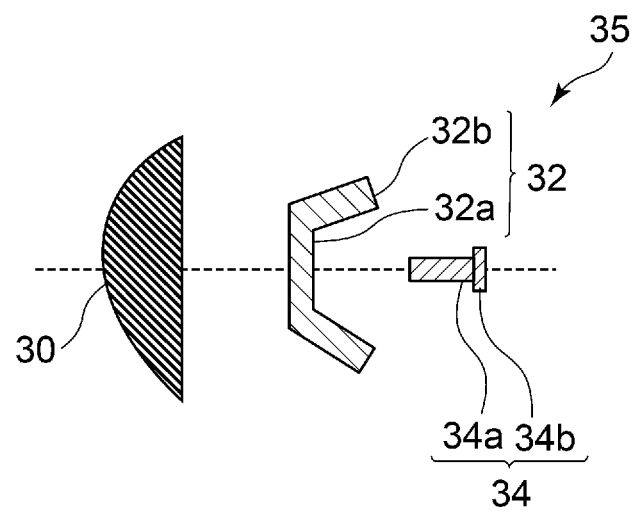
FIG. 5A is an explanatory cross-sectional view corresponding to FIG. 4.
Figure 5B:
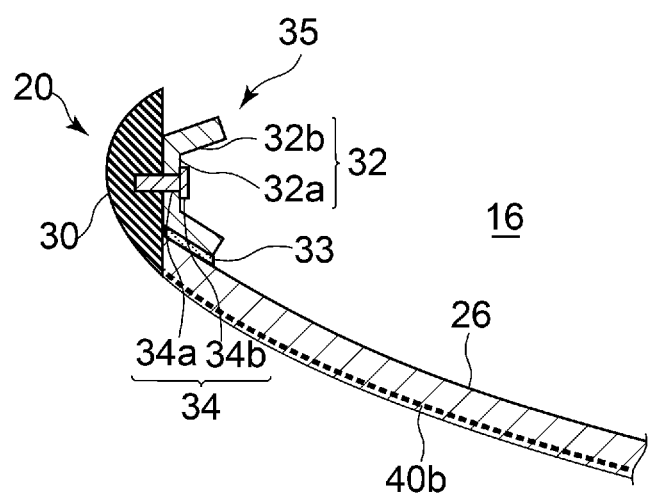
FIG. 5B is an explanatory cross-sectional view corresponding to FIG. 4.
Figure 5C:
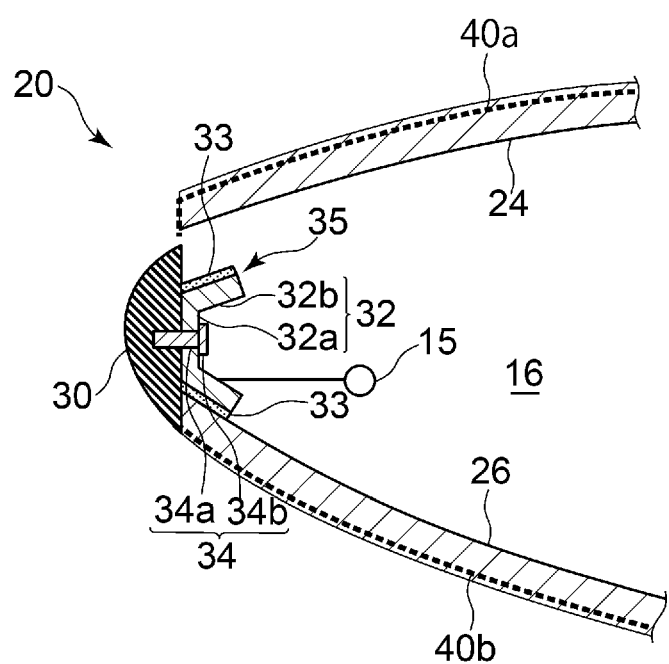
FIG. 5C is an explanatory cross-sectional view corresponding to FIG. 4.

Next, a method of manufacturing the windmill blade 2 having the configuration in FIG. 3 will be described. FIG. 4 is a flowchart illustrating a method of manufacturing the windmill blade 2 in FIG. 3 for each step, and FIGS. 5A to 5C are explanatory cross-sectional views corresponding to FIG. 4.

First, the suction-side skin 24 and the pressure-side skin 26 constituting the blade main body 18 of the windmill blade 2 are formed separately (step S100). The suction-side skin 24 and the pressure-side skin 26 are formed by, for example, laminating a fiber material (a glass fiber material in the case of GFRP, or a carbon fiber material in the case of CFRP) on a mold material corresponding to the shape of the skin, injecting liquid resins, impregnating the laminated fiber material with the liquid resins, and curing the liquid resins (e.g., vacuum assisted resin transfer molding (VaRTM) method) can be used).

Subsequently, the first fixing member 32 and the second fixing member 34 are attached to the leading edge protector 30 to prepare a leading edge structural body 35 (step S101). The leading edge structural body 35 is prepared by attaching the first fixing member 32 and the second fixing member 34 to the leading edge protector 30 as illustrated in FIG. 5A. Each of the leading edge protector 30, the first fixing member 32, and the second fixing member 34 can be manufactured by a typical process such as three-dimensional forming or cutting.

Subsequently, the leading edge structural body 35 prepared in step S101 is fixed to the pressure-side skin 26 formed in step S100 (step S102). The fixing work of step S102 is performed by forming the bonding layer 33 between the extending portion 32b of the first fixing member 32 in the leading edge structural body 35 and the inner surface 26a of the pressure-side skin 26 as illustrated in FIG. 5B.

Subsequently, as illustrated in FIG. 5C, the down conductor 15 disposed in the hollow space 16 is electrically connected to the leading edge structural body 35 fixed to the pressure-side skin 26 (step S103). More specifically, the down conductor 15 is electrically connected to the extending portion 32b of the first fixing member 32 in the leading edge structural body 35. At this time, since the suction-side skin 24 is not provided in the windmill blade 2 being manufactured, the worker can easily access the hollow space 16 and perform work.

Subsequently, the suction-side skin 24 is fixed to the leading edge structural body 35 (step S104). The fixing work of step S104 is performed by forming the bonding layer 33 between the extending portion 32b of the first fixing member 32 in the leading edge structural body 35 and the inner surface 24a of the suction-side skin 24 in the range where the leading edge structural body 35 is present in the windmill blade 2 as illustrated in FIG. 5C, and the suction-side skin 24 is directly fixed to the pressure-side skin 26 in the range where the leading edge structural body 35 is not present in the windmill blade 2. Thus, the hollow space 16 is formed between the pressure-side skin 26 and the suction-side skin 24, and the windmill blade 2 is completed.

Figure 6:
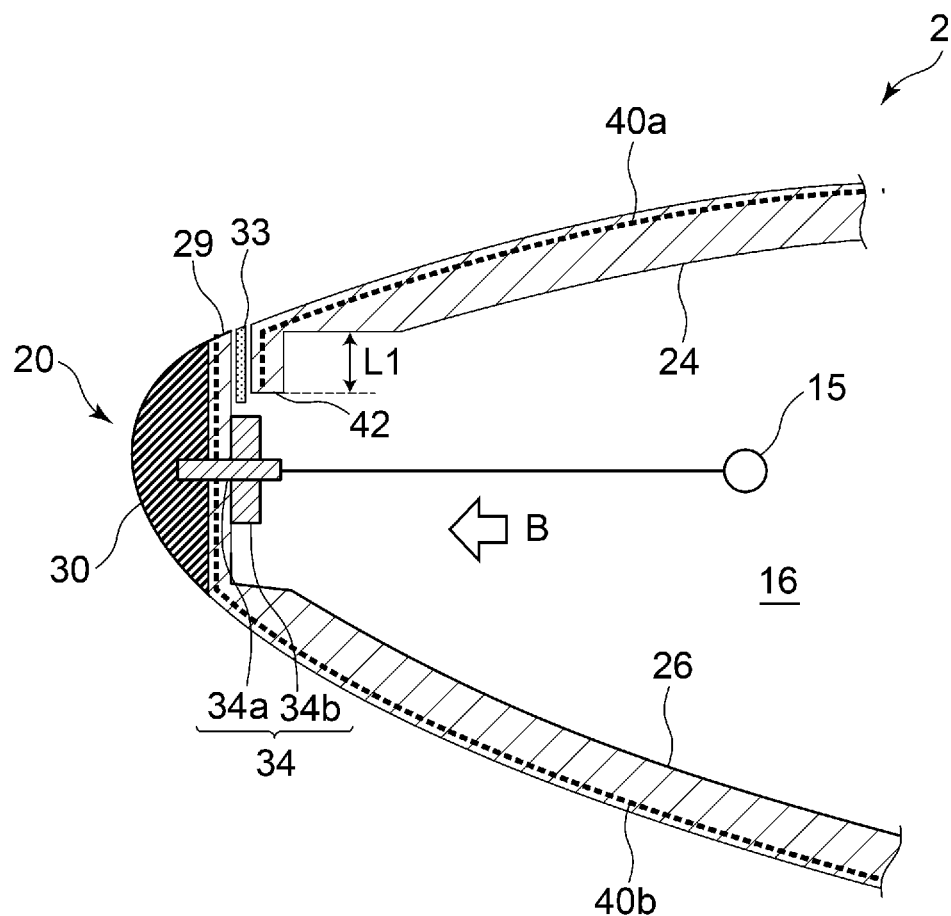
FIG. 6 is a cross-sectional view illustrating another embodiment of FIG. 3.
Figure 7:
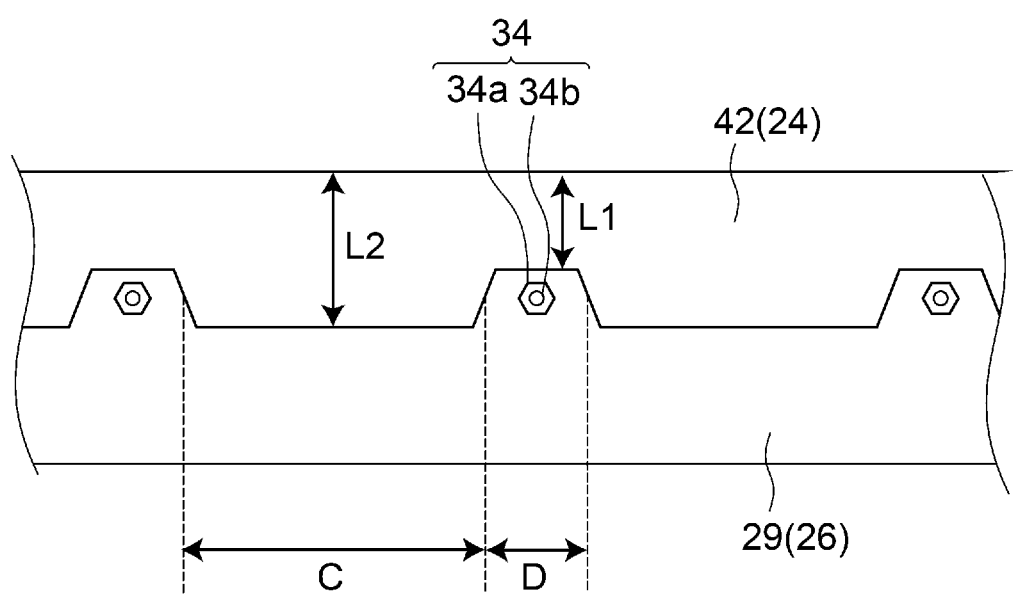
FIG. 7 is a view from B of FIG. 6.

Next, a windmill blade 2 according to another embodiment will be described. FIG. 6 is a cross-sectional view illustrating another embodiment of FIG. 3, and FIG. 7 is a view from B in FIG. 6.

A skin constituting the blade main body 18 includes a first skin extending portion 29 extending so as to be interposed between the leading edge protector 30 and the hollow space 16. In the present embodiment, the first skin extending portion 29 is provided on the leading edge side of the pressure-side skin 26 so as to extend toward the suction-side skin 24 such that the first skin extending portion 29 is interposed between the leading edge protector 30 and the hollow space 16.

The leading edge protector 30 is fixed to the first skin extending portion 29. More specifically, one end of the bolt member 34a provided so as to penetrate the first skin extending portion 29 is fixed to the leading edge protector 30, and the other end of the bolt member 34a is engaged with the nut member 34b, whereby the leading edge protector 30 is fixed to the first skin extending portion 29. In this way, the leading edge protector 30 can be directly fixed to the first skin extending portion 29 which is a part of the skin without depending on the adhesive force of the bonding layer 33. By using such a fixing structure, it is possible to provide the leading edge protector 30 on the blade main body 18 with a more reliable fixing structure without exposing, to the outside of the blade main body, various members for fixing the leading edge protector 30 to the skins.

A second skin extending portion 42 is provided on the suction-side skin 24 facing the pressure-side skin 26 including the first skin extending portion 29. The second skin extending portion 42 extends from the leading edge side of the suction-side skin 24 toward the pressure-side skin 26 so as to face the first skin extending portion 29. The first skin extending portion 29 and the second skin extending portion 42 are bonded to each other via the bonding layer 33. Since the first skin extending portion 29 and the second skin extending portion 42 are disposed so as to face each other, a large bonding area via the bonding layer 33 is obtained, and the suction-side skin 24 and the pressure-side skin 26 are also fixed to each other with satisfactory strength while the leading edge protector 30 is fixed to the skins with satisfactory strength. Thus, the windmill blade 2 having a more reliable structure can be achieved.

A conductive mesh member 40b provided in the pressure-side skin 26 extends to the first skin extending portion 29. In the first skin extending portion 29, the conductive mesh member 40b is electrically connected to the leading edge protector 30 by being connected to the bolt member 34a penetrating the first skin extending portion 29. Thus, the electrical resistance value between the leading edge protector 30 and the conductive mesh member 40b can be reduced, and the lightning protection performance of the windmill blade 2 can be improved.

Additionally, the conductive mesh member 40a provided in the suction-side skin 24 extends to the second skin extending portion 42.

As illustrated in FIG. 7, a dimension L2 of the second skin extending portion 42 in the direction perpendicular to the blade longitudinal direction in a range C where the bolt member 34a and the nut member 34b for fixing the leading edge protector 30 in the blade longitudinal direction do not exist is larger than a dimension L1 in a range D where the bolt member 34a and the nut member 34b exist. Accordingly, it is possible to provide a large joining area between the first skin extending portion 29 and the second skin extending portion 42, and it is possible to more firmly join the suction-side skin 24 and the pressure-side skin 26.

Figure 8:
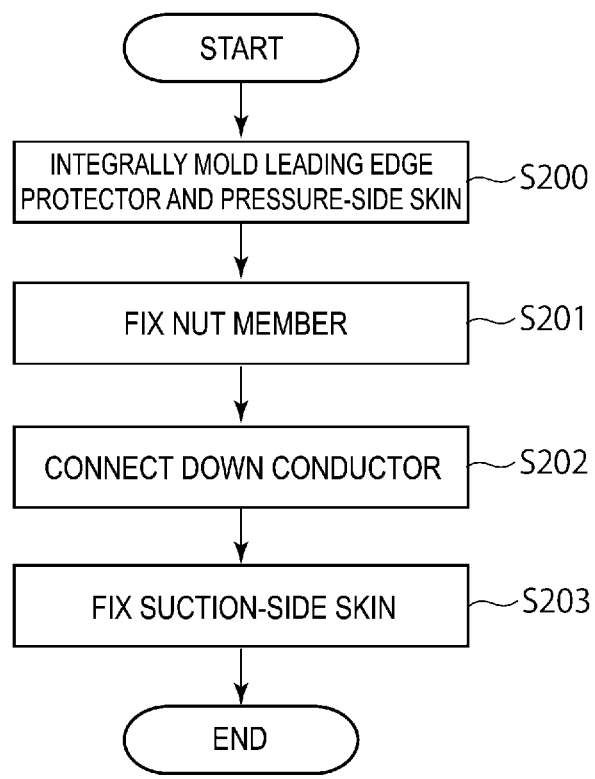
FIG. 8 is a flowchart illustrating a method of manufacturing the windmill blade in FIGS. 6 and 7 for each step.

Next, a method of manufacturing the windmill blade 2 having the configuration in FIGS. 6 and 7 will be described. FIG. 8 is a flowchart illustrating a method of manufacturing the windmill blade 2 in FIGS. 6 and 7 for each step, and FIGS. 9A to 9C are explanatory diagrams corresponding to FIG. 8.

First, the leading edge protector 30 is formed integrally with the pressure-side skin 26 (step S200). FIG. 10 is a sub-flowchart illustrating an example of detailed steps of step S200 in FIG. 8. In step S200, first, as illustrated in FIG. 9A, the leading edge protector 30 in which one end of the bolt member 34a is attached to a trailing edge side surface 43 is disposed in a mold material for molding (step S200-1). Then, on the leading edge protector 30 arranged in the mold material, the constituent material of the skin (glass fiber material for GFRP and carbon fiber material for CFRP) is laminated such that the bolt member 34a is exposed (step S200-2). Then, after the constituent material of the skin is sufficiently solidified, the molded product is taken out from the mold material, thereby completing an integrally molded product of the pressure-side skin 26 and the leading edge protector 30 (step S200-3).

Figure 9A:
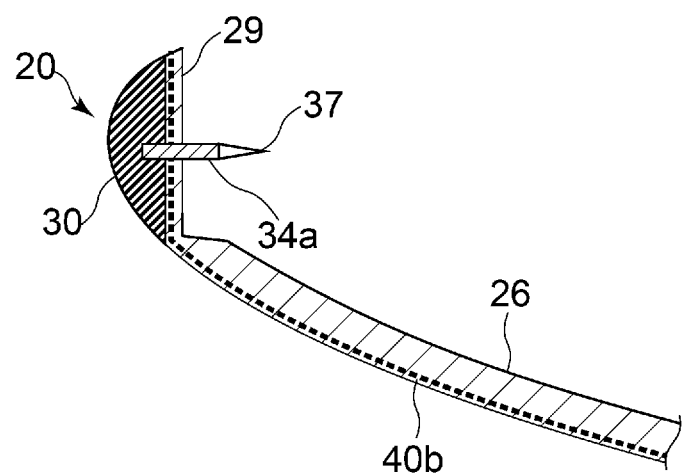
FIG. 9A is an explanatory diagram corresponding to FIG. 8.
Figure 9B:
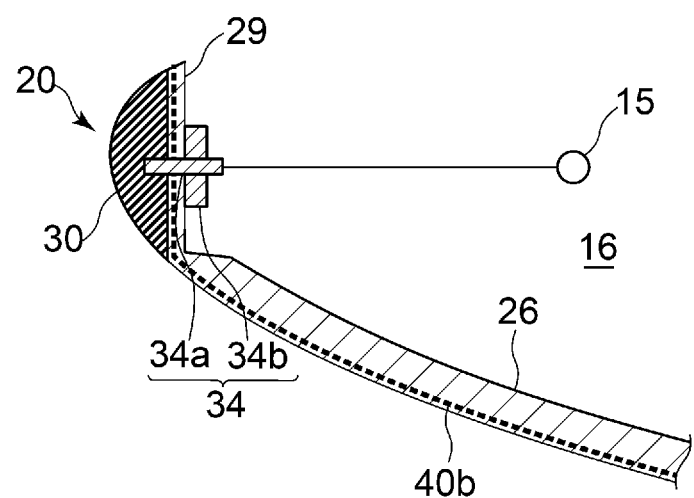
FIG. 9B is an explanatory diagram corresponding to FIG. 8.
Figure 9C:
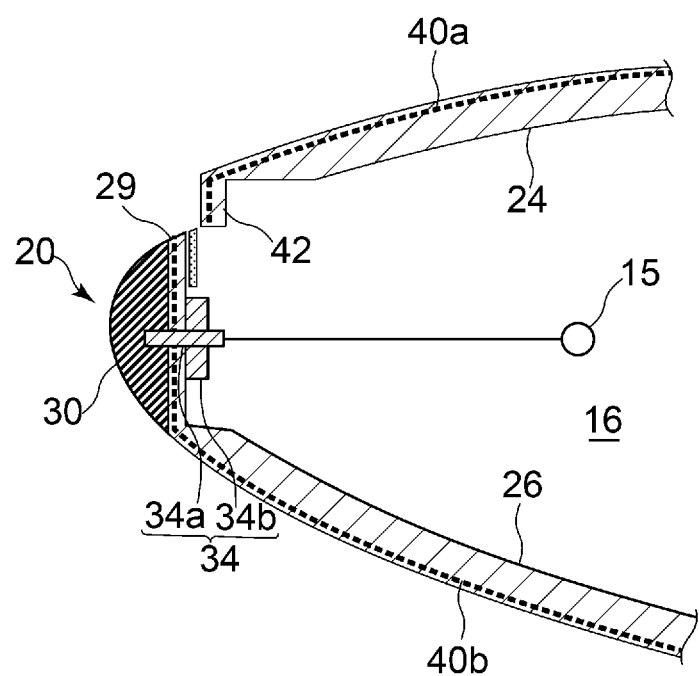
FIG. 9C is an explanatory diagram corresponding to FIG. 8.
Figure 10:
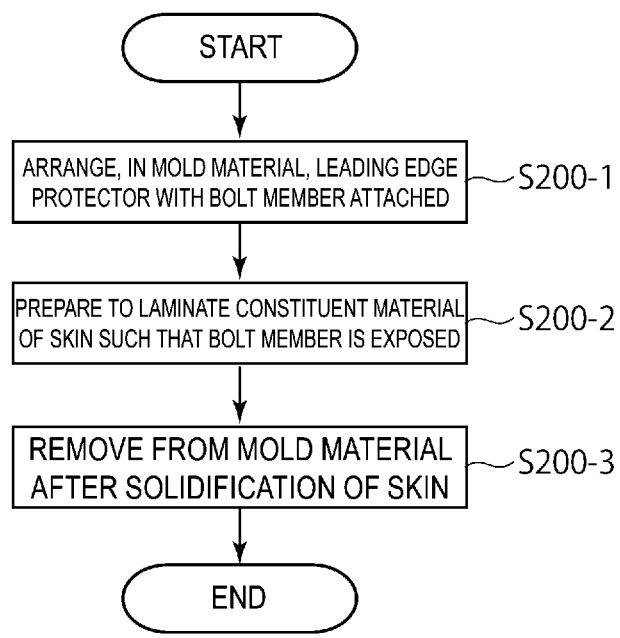
FIG. 10 is a sub-flowchart illustrating an example of detailed steps of step S200 in FIG. 8.

In addition, when the constituent material of the skin is laminated in step S200-2, an auxiliary member 37 having a sharp tip may be removably attached to the other end of the bolt member 34a as illustrated in FIG. 9A. Accordingly, for example, the bolt member 34a penetrates a fiber material having a sheet shape, and in step S200-2, it is possible to facilitate the laminating work of the constituent material while exposing the bolt member 34a.

The auxiliary member 37 is removed after the laminating work in step S200-2 is completed.

Returning to FIG. 8, subsequently, as illustrated in FIG. 9B, with respect to the integrally molded product manufactured in step S200, the nut member 34b is engaged with the other end of the bolt member 34a (step S201), and the down conductor 15 disposed in the hollow space 16 is electrically connected to the bolt member 34a (step S202).

The down conductor 15 may be electrically connected to the nut member 34b instead of the bolt member 34a. In this case, before the nut member 34b is engaged with the other end of the bolt member 34a in step S201, the down conductor 15 may be electrically connected to the nut member 34b in advance.

Subsequently, the suction-side skin 24 is fixed to the pressure-side skin 26 on which the above-described work has been performed (step S203). In step S203, the pressure-side skin 26 and the suction-side skin 24 are connected via the bonding layer 33, whereby the hollow space 16 surrounded by the pressure-side skin 26 and the suction-side skin 24 is formed. More specifically, the bonding layer 33 is formed by joining the first skin extending portion 29 and the second skin extending portion 42 by using an adhesive.

Figure 11:
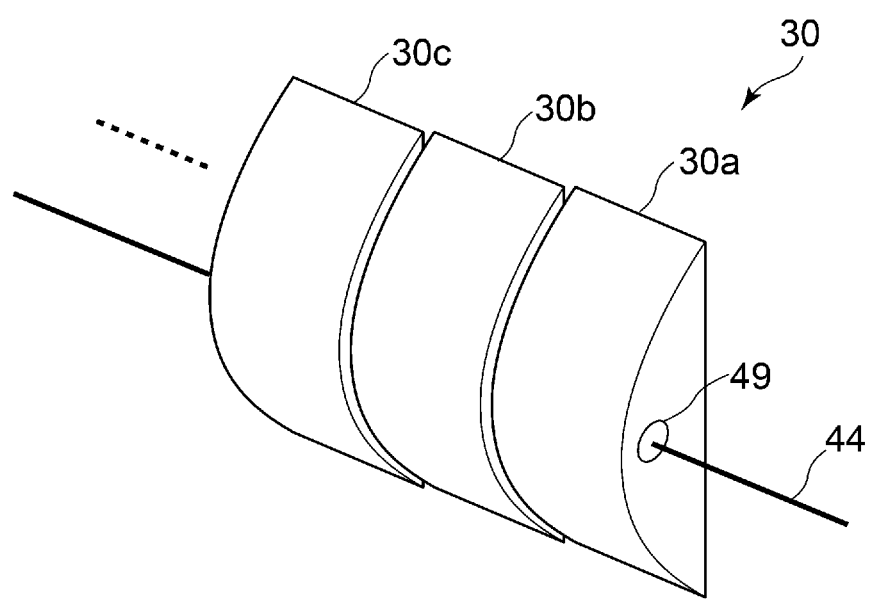
FIG. 11 is a perspective view of a plurality of protector members constituting a leading edge protector.

Note that the leading edge protector 30 in each of the above-described embodiments may be configured to include a plurality of protector members 30a, 30b, 30c, ... arranged along the blade longitudinal direction of the blade main body 18. FIG. 11 is a perspective view of the plurality of protector members 30a, 30b, 30c, ... constituting the leading edge protector 30. By configuring the leading edge protector 30 from the plurality of protector members 30a, 30b, 30c, ... in this way, it is possible to effectively reduce the strain that occurs in the leading edge protector 30 during operation of the windmill 1. Further, even in the windmill blade 2 in which the size of the blade main body 18 along the blade longitudinal direction is large, the leading edge portion 20 can be protected from erosion damage over a wide range.

As illustrated in FIG. 11, the plurality of protector members 30a, 30b, 30c, ... may be connected to each other by a support wire 44 extending along the blade longitudinal direction. The plurality of protector members 30a, 30b, 30c, ... each has a hole 49 provided coaxially along the blade longitudinal direction, and are connected to each other by inserting the support wire 44 into the holes 49. By connecting the plurality of protector members 30a, 30b, 30c, . . . constituting the leading edge protector 30 by the support wire 44 in this manner, it is possible to prevent each of the protector members 30a, 30b, 30c, . . . from falling off.

The hole 49 into which the support wire 44 is inserted may be filled with an adhesive. Accordingly, since the support wire 44 is fixed inside the hole 49, the risk of the support wire 44 being cut by friction or the like can be reduced.

In the leading edge protector 30 having such a configuration, a part of the plurality of protector members 30a, 30b, 30c, . . . may be fixed to the skin constituting the blade main body 18. In this case, the leading edge protector 30 can be fixed with a simpler configuration than in the case where all the protector members 30a, 30b, 30c, . . . are fixed to the skin.

As described above, according to each of the above embodiments, it is possible to obtain the windmill blade 2 capable of obtaining satisfactory erosion resistance performance while maintaining aerodynamic performance. In the windmill 1 including such a windmill blade 2, the leading edge protector 30 prevents erosion damage of the windmill blade 2, thereby extending the service life of the windmill 1. In addition, it is possible to perform efficient operation while suppressing a decrease in aerodynamic performance, due to installation of the leading edge protector 30.

In addition, it is possible to replace the components in the above-described embodiments with well-known components as appropriate without departing from the spirit of the present disclosure, and the above-described embodiments may be combined as appropriate.

The contents described in each of the above-described embodiments are understood as follows, for example.

(1) A windmill blade according to one aspect includes: a blade main body (e.g., the blade main body 18 according to the above-described embodiment) including a skin (e.g., the suction-side skin 24 or the pressure-side skin 26 according to the above-described embodiment) surrounding a hollow space (e.g., the hollow space 16 according to the above-described embodiment); and a leading edge protector (e.g., the leading edge protector 30 according to the above-described embodiment) provided at a leading edge portion (e.g., the leading edge portion 20 according to the above-described embodiment) of the blade main body, and the leading edge protector is fixed to the skin from an inner side of the hollow space.

According to the above-described aspect (1), the leading edge protector provided on the leading edge side of the windmill blade is fixed to the skin constituting the blade main body from the inner side of the hollow space provided in the blade main body. Since various members for fixing the leading edge protector to the skin are not exposed to the outside of the blade main body, the erosion damage of the windmill blade can be effectively suppressed without reduction in the aerodynamic performance of the windmill blade.

(2) In another aspect, in the above-described aspect (1), there are provided: a first fixing member (e.g., the first fixing member 32 according to the above-described embodiment) fixed to an inner surface of the skin and disposed to come into contact with the leading edge protector from the hollow space side; and a second fixing member (e.g., the second fixing member 34 according to the above-described embodiment) fixing the leading edge protector together with the first fixing member from the inner side of the hollow space.

According to the above-described aspect (2), the leading edge protector is fixed by the second fixing member, together with the first fixing member fixed to the inner surface of the skin. Accordingly, the fixing structure of the leading edge protector in which various members for fixing the leading edge protector to the skin are not exposed to the outside of the blade main body can be configured with an efficient layout.

(3) In another aspect, in the above-described aspect (2), the second fixing member includes: a bolt member (e.g., the bolt member 34a according to the above-described embodiment) penetrating the first fixing member and having one end fixed to the leading edge protector; and a nut member (e.g., the nut member 34b according to the above-described embodiment) engaged with another end of the bolt member from the hollow space side.

According to the above-described aspect (3), the second fixing member is constituted by the bolt member and the nut member, so that the leading edge protector can be fixed to the skin in an efficient layout together with the first fixing member fixed to the inner surface of the skin.

(4) In another aspect, in the above-described aspect (2) or (3), the first fixing member includes: a main body portion (e.g., the main body portion 32a according to the above-described embodiment) in contact with the leading edge protector; and an extending portion (e.g., the extending portion 32b according to the above-described embodiment) connected to the main body portion and extending along the inner surface of the skin.

According to the above-described aspect (4), the first fixing member fixed to the inner surface of the skin has a configuration in which the extending portion is provided on the main body portion in contact with the leading edge protector. The extending portion extends along the inner surface of the skin to increase a contact area of the first fixing member with the skin. As a result, the first fixing member can be more firmly fixed to the skin, the risk of falling off of the leading edge protector from the blade main body is reduced, and a highly reliable configuration can be achieved.

(5) In another aspect, in any one of the above-described aspects (2) to (4), the first fixing member is fixed between a pair of inner surfaces of the skin, the pair of inner surfaces facing each other, and a distance between the pair of inner surfaces decreases toward the leading edge portion.

According to the above-described aspect (5), the first fixing member is fixed between the pair of inner surfaces that face each other in the skin. The distance between the pair of inner surfaces is configured to decrease toward the leading edge portion, thereby structurally preventing the first fixing member sandwiched therebetween from coming out to the outside. This further reduces the risk of the leading edge protector falling off from the blade main body.

(6) In another aspect, in the above-described aspect (1), the skin includes a first skin extending portion (e.g., the first skin extending portion 29 according to the above-described embodiment) that extends to be interposed between the leading edge protector and the hollow space, and the leading edge protector is fixed to the first skin extending portion.

According to the above-described aspect (6), the first skin extending portion is provided in which a part of the skin constituting the blade main body extends so as to be interposed between the leading edge protector and the hollow space. Since the leading edge protector is fixed to such a first skin extending portion, a fixing structure of the leading edge protector in which various members for fixing the leading edge protector to the skin are not exposed to the outside of the blade main body can be configured with an efficient layout.

(7) In another aspect, in the above-described aspect (6), there are further provided: a bolt member (e.g., the bolt member 34a according to the above-described embodiment) that penetrates the first skin extending portion and has one end fixed to the leading edge protector; and a nut member (e.g., the nut member 34b according to the above-described embodiment) engaged with another end of the bolt member from the hollow space side.

According to the above-described aspect (7), the leading edge protector is fixed to the first skin extending portion by fixing the bolt member penetrating through the first skin extending portion with the nut member. By directly fixing the leading edge protector to the part of the skin in this manner, the leading edge protector can be more firmly fixed to the skin.

(8) In another aspect, in the above-described aspect (6) or (7), the skin includes a suction-side skin (e.g., the suction-side skin 24 according to the above-described embodiment) and a pressure-side skin (e.g., the pressure-side skin 26 according to the above-described embodiment) facing each other, the first skin extending portion is provided on one of the suction-side skin or the pressure-side skin, the other of the suction-side skin or the pressure-side skin includes a second skin extending portion (e.g., the second skin extending portion 42 according to the above-described embodiment) that extends to face the first skin extending portion, and the first skin extending portion and the second skin extending portion are bonded to each other.

According to the above-described aspect (8), the skin to which the leading edge protector is fixed is constituted by the suction-side skin and the pressure-side skin that face each other. One of the suction-side skin and the pressure-side skin is provided with the first skin extending portion described above, and the other skin is provided with the second skin extending portion. The first skin extending portion and the second skin extending portion are bonded to each other, whereby the leading edge protector is fixed to the blade main body via both of the first skin extending portion and the second skin extending portion. Accordingly, the leading edge protector can be more firmly fixed to the skin, and a windmill blade with higher reliability can be configured.

(9) In another aspect, in any one of the above-described aspects (1) to (8), the leading edge protector includes a plurality of protector members (e.g., the plurality of protector members 30a, 30b, 30c, . . . according to the above-described embodiment) arranged along a blade longitudinal direction of the blade main body.

According to the above-described aspect (9), the leading edge protector is constituted by the plurality of protector members arranged along the blade longitudinal direction. As a result, it is possible to effectively reduce a strain generated in the leading edge protector during operation of the windmill. In addition, even in a windmill blade in which the size of the blade main body along the blade longitudinal direction is large, the leading edge portion can be protected from erosion damage over a wide range.

(10) In another aspect, in the above-described aspect (9), the plurality of protector members are connected to each other by a support wire (e.g., the support wire 44 according to the above-described embodiment) extending along the blade longitudinal direction.

According to the above-described aspect (10), the plurality of protector members constituting the leading edge protector are connected by the support wire, and thus it is possible to prevent each protector member from falling off.

(11) In another aspect, in the above-described aspect (9) or (10), a part of the plurality of protector members is fixed to the skin.

According to the above-described aspect (11), a part of the plurality of protector members constituting the leading edge protector is fixed to the skin. As a result, the configuration is simplified as compared with the case where all the protector members are fixed to the skin.

(12) In another aspect, in one of the above-described aspects (1) to (11), the leading edge protector is composed of a conductive material.

According to the above-described aspect (12), when the windmill blade is struck by lightning, the leading edge protector composed of the conductive material forms at least a part of a transmission path of a lightning current, thereby obtaining satisfactory lightning protection performance.

(13) In another aspect, in the above-described aspect (12), the leading edge protector is electrically connected to a conductive mesh member (e.g., the conductive mesh members 40a and 40b according to the above-described embodiment) provided along the outer surface of the skin.

According to the above-described aspect (13), the leading edge protector composed of the conductive material is electrically connected to the conductive mesh member provided along an outer surface of the skin constituting the windmill blade. As a result, when the windmill blade is struck by lightning, the electrical resistance value in the transmission path of the lightning current is further reduced, and satisfactory lightning protection performance is obtained.

(14) In another aspect, in the above-described aspect (12) or (13), the leading edge protector is electrically connected to a down conductor disposed in the hollow space.

According to the above-described aspect (14), the leading edge protector composed of the conductive material is electrically connected to the down conductor disposed in the hollow space. As a result, when the windmill blade is struck by lightning, the electrical resistance value in the transmission path of the lightning current is further reduced, and satisfactory lightning protection performance is obtained.

(15) In another aspect, in any one of the above-described aspects (1) to (11), the leading edge protector is composed of ceramic.

According to the above-described aspect (15), since the leading edge protector is composed of hard ceramic, it is possible to reduce the weight of the windmill blade while achieving the erosion resistance performance.

(16) A windmill according to one aspect includes the windmill blade according to any one of the above-described aspects (1) to (15).

According to the above-described aspect (16), the windmill includes the windmill blade of each of the above-described aspects, so that it is possible to suppress a decrease in aerodynamic performance due to installation of the leading edge protector while preventing, by the leading edge protector, erosion damage of the windmill blade.

(17) A method of manufacturing a windmill blade according to one aspect is provided in which the windmill blade includes: a blade main body including a skin surrounding a hollow space; and a leading edge protector provided at a leading edge portion of the blade main body, the leading edge protector is fixed to the skin from an inner side of the hollow space, and the method includes: arranging, in a mold material for molding, the leading edge protector that has a trailing edge side surface to which one end of a bolt member is attached (e.g., step S200-1 according to the above-described embodiment); laminating a constituent material of the skin on the leading edge protector such that the bolt member is exposed (e.g., step S200-2 according to the above-described embodiment); and taking out a molded product from the mold material and engaging a nut with another end of the bolt member (e.g., step S200-3 according to the above-described embodiment).

According to the above-described aspect (17), it is possible to efficiently manufacture the windmill blade in which the leading edge protector is fixed to the skin constituting the blade main body from the inner side of the hollow space.

The trailing edge side surface is a surface of the leading edge protector facing the trailing edge side in the finished product of the windmill blade.

(18) In another aspect, in the above-described aspect (17), in the laminating of the constituent material, an auxiliary member including a sharp tip (e.g., the auxiliary member 37 according to the above-described embodiment) is removably attached to the other end of the bolt member.

According to the above-described aspect (18), when the constituent materials are laminated, attaching the auxiliary member having a sharp tip to the bolt member enables the bolt member to penetrate the constituent member and facilitates the laminating work of the constituent materials while the bolt member is exposed.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A windmill blade, comprising:
a blade main body including a skin surrounding a hollow space; and
a leading edge protector at a leading edge portion of the blade main body, the leading edge protector being fixed to the skin from the hollow space;
a first fixing member fixed to an inner surface of the skin and disposed in contact with the leading edge protector from a hollow space side; and
a second fixing member that fixes the leading edge protector together with the first fixing member from the hollow space,
wherein the second fixing member includes:
a bolt member penetrating the first fixing member and having a first end fixed to the leading edge protector such that the first end of the bolt member extends only partially through a thickness of the leading edge protector and does not penetrate an outer surface of the leading edge protector opposite to the hollow space side; and
a nut member engaged with a second end of the bolt member from the hollow space side.

2. The windmill blade according to claim 1, wherein the first fixing member includes:
a main body portion in contact with the leading edge protector; and
an extending portion connected to the main body portion and extending along the inner surface of the skin.

3. The windmill blade according to claim 1, wherein:
the inner surface of the skin is a first inner surface of the skin;
the first fixing member is fixed between the first inner surface of the skin and a second inner surface of the skin, the first inner surface of the skin and the second inner surface of the skin facing each other; and
a distance between the first inner surface of the skin and the second inner surface of the skin decreases toward the leading edge portion of the blade main body.

4. The windmill blade according to claim 1, wherein the leading edge protector includes plural protector members arranged along a blade longitudinal direction of the blade main body.

5. The windmill blade according to claim 4, wherein the plural protector members are connected to each other by a support wire extending along the blade longitudinal direction of the blade main body.

6. The windmill blade according to claim 4, wherein a part of each of the plural protector members is fixed to the skin.

7. The windmill blade according to claim 1, wherein the leading edge protector is composed of a conductive material.

8. The windmill blade according to claim 7, wherein the leading edge protector is electrically connected to a conductive mesh member extending along an outer surface of the skin.

9. The windmill blade according to claim 7, wherein the leading edge protector is electrically connected to a down conductor disposed in the hollow space.

10. The windmill blade according to claim 1, wherein the leading edge protector is composed of ceramic.

11. A windmill comprising the windmill blade according to claim 1.

12. A method of manufacturing a windmill blade,
the windmill blade including:
a blade main body including a skin surrounding a hollow space; and
a leading edge protector at a leading edge portion of the blade main body, the leading edge protector being fixed to the skin from the hollow space, and
the method comprising:
arranging, in a mold material for molding, the leading edge protector that has a trailing edge side surface to which a first end of a bolt member is attached;
laminating a constituent material of the skin on the leading edge protector such that the bolt member is exposed; and
taking out a molded product from the mold material and engaging a nut with a second end of the bolt member.

13. The method according to claim 12, wherein in the laminating of the constituent material of the skin, an auxiliary member including a tip is removably attached to the second end of the bolt member.

* * * * *